United States Patent [19]

Schmitt

[11] Patent Number: 5,199,721
[45] Date of Patent: Apr. 6, 1993

[54] CRANKSHAFT SEAL FOR AN INTERNAL COMBUSTION ENGINE

[75] Inventor: Wolfgang Schmitt, Viernheim, Fed. Rep. of Germany

[73] Assignee: Firma Carl Freudenberg, Weinheim/Bergstr., Fed. Rep. of Germany

[21] Appl. No.: 839,794

[22] Filed: Feb. 21, 1992

[30] Foreign Application Priority Data

May 16, 1991 [DE] Fed. Rep. of Germany ....... 4115922

[51] Int. Cl.$^5$ .............................................. F16J 15/32
[52] U.S. Cl. ................................ 277/181; 277/152; 277/183
[58] Field of Search ............... 277/181, 182, 183, 184, 277/152, 153, DIG. 4, 137 A, 37, 47

[56] References Cited

U.S. PATENT DOCUMENTS

| | | | |
|---|---|---|---|
| 2,958,551 | 11/1960 | Rogers | 277/237 A X |
| 3,917,286 | 11/1975 | Loyd | 277/153 X |
| 4,155,560 | 5/1979 | Repella | 277/153 |
| 4,278,261 | 7/1981 | Miura et al. | 277/153 |
| 4,304,416 | 12/1981 | Oshima | 277/DIG. 4 X |
| 4,484,751 | 11/1984 | Deuring | 277/DIG. 4 X |
| 4,799,691 | 1/1989 | Stritzke et al. | 277/DIG. 4 X |
| 4,928,980 | 5/1990 | Deuring | 277/237 A X |

FOREIGN PATENT DOCUMENTS

| | | | |
|---|---|---|---|
| 78715 | 7/1955 | Netherlands | 277/153 |
| 2085096 | 4/1982 | United Kingdom | 277/152 |
| 2147666 | 5/1985 | United Kingdom | 277/153 |

Primary Examiner—William A. Cuchlinski, Jr.
Assistant Examiner—Daniel G. DePumpo
Attorney, Agent, or Firm—Felfe & Lynch

[57] ABSTRACT

Crankshaft seal for an internal combustion engine, comprising a die cast metal carrier (1) with a lipped ring of polymeric material which is fastened to the carrier by means of a support piece (2) of sheet metal. The support piece (2) is defined by a radially outwardly projecting flange section (2.1), the flange section (2.1) being held in an axially open recess (1.1) of the carrier (1) and being provided on the side facing axially away from the carrier (1) with at least one axially protruding sealing lip (3.1,3.2).

7 Claims, 2 Drawing Sheets

CRANKSHAFT SEAL FOR AN INTERNAL COMBUSTION ENGINE

BACKGROUND OF THE INVENTION

The invention relates to a crankshaft seal for an internal combustion engine, comprising a die cast carrier with a lipped ring of polymeric material which is fastened to the carrier by means of a supporting piece formed of sheet metal.

Such a crankshaft seal for an internal combustion engine is disclosed in U.S. Pat. No. 4,484,751. A die cast cover has a dynamic sealing area and two static sealing areas, all three disposed in different planes. All three sealing areas lying in different planes have profiled rubber sealing elements, the sealing element for sealing the crankshaft being vulcanized onto a radial projection of the basic carrier body, while the other sealing elements, which are formed by rubber rectangular profiles, are fixed in milled grooves. This arrangement assures a precise fixation provided with uniform contact pressure on the adjacent part, but it is to be noted that, on account of the direct arrangement of the sealing elements in the cover results in an elevated cost of manufacture, so that the cover is not very satisfactory from an economic point of view. Furthermore, this arrangement is comparatively heavy.

A similar crankshaft seal is disclosed in U.S. Pat. No. 4,928,980. Accordingly, a cover for a casing has a dynamically acting seal for sealing a shaft and a statically acting seal for a cover flange surface, the cover consisting of a drawn sheet-metal body with a plurality of radial surfaces onto which the seals are vulcanized. However, it is to be noted that a plurality of fastening holes are to be provided at close intervals in order to produce a sufficiently great pressure of the sheet-metal cover an engine block. Furthermore, the thickness of the sheet metal body is comparatively great and it has numerous bends, making the body difficult to manufacture.

SUMMARY OF THE INVENTION

The invention is addressed to the problem of improving a crankshaft seal of the kind described above such that the shaft seal is produced independently of the static seal. Thus the seals are non-integral and can consist advantageously of different materials. Furthermore, the manufacture and the installation of the crankshaft seal are to be definitely simplified, with definitely less weight and employment of material, so that the crankshaft seal can be manufactured at low cost from the economic point of view.

In the crankshaft seal provision made for a support piece is defined by a radially outwardly projecting flange section, and for the flange section to be received in an axially opened recess in the carrier and provided on the side facing axially away from the carrier with at least one projecting sealing lip. In this case it is advantageous that the injection-molded part does not come directly in contact with the seals. Fine finishing of the contact surfaces is no longer necessary as it was in the seals known heretofore. Furthermore, the oil pan seal can be replaced separately, and the dynamically stressed shaft seal can be produced independently of the static seal. The materials used can thus be better adapted as regards purpose and stresses to the circumstances of the particular application. The shaft seal can consist, for example, of PTFE or FKM, while the static seal consists preferably of ACM or silicone. The supporting piece bearing the sealing lips is very lightweight and therefore easy to handle. It can have, for example, a Z-like cross section on whose projections the seals are vulcanized. The supporting piece is produced separately from the carrier and combined with the latter afterward.

The carrier can terminate in a planar transverse surface running parallel to the crankshaft and the sealing lip can terminate in a transverse lip integrally formed thereon, which in the as-manufactured condition reaches in wedge shape beyond sealing lip on the side facing away in the axial direction from the carrier but does not reach beyond the plane of the transverse surface. This configuration promotes easy of installation of the crankshaft seal. Any damage to the transverse lip which reaches in wedge shape beyond the transverse surface is virtually excluded. Only when the crankshaft seal is installed and ready to run does the wedge-shaped transverse lip lie sealingly against the adjacent oil pan. In the as-manufactured state the transverse lip is protected by the transverse surface of the carrier. While the crankshaft seal assembly is being fastened by means of screws, for example, the transverse lip applies itself sealingly to the axially adjoining engine, and becomes resiliently deformed, thus providing a seal for the oil pan below. In this manner a reliable seal and very good practical qualities are assured over a long period of use.

According to an advantageous embodiment, provision is made for a plurality of axially protruding sealing lips to be defined in common by the transverse lip. This assures an improved sealing in the axial direction, against an internal combustion engine, for example.

Due to the bipartite configuration of the carrier and the supporting piece, the support piece bearing the sealing lips can be made very light in weight and thus is very easy to handle. Also the carrier, which does not directly contact a rubber seal, can be made significantly lighter. This is possible since the rubber seals do not have to be as stiff. The two parts can be joined together by cementing with adhesive. In this case it is advantageous that the carrier and the support piece are joined reliably and lastingly to one another without increasing the dimensions of the entire crankshaft seal in the axial direction.

The support piece can consist of deep-drawn sheet metal. On account of its simple shape, and the fact that most of the forces are absorbed by the carrier, the support piece can be made from comparatively thin sheet metal, at low cost from the economic point of view.

To keep the weight of the crankshaft seal low, the carrier can consist of a pressure-cast light metal.

DETAILED DESCRIPTION OF THE PREFERRED EMBODIMENT

Figure 1:
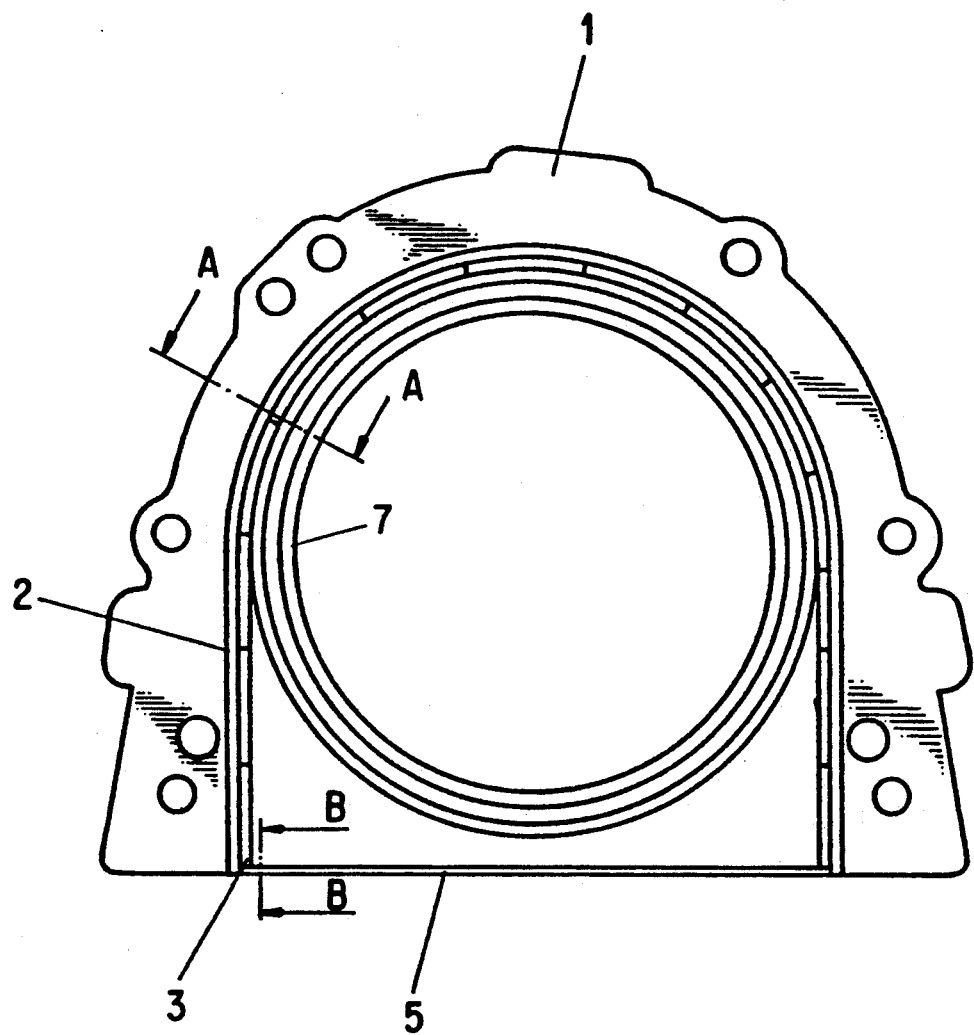
FIG. 1 shows the crankshaft seal of the invention as seen from the engine side.
Figure 2:
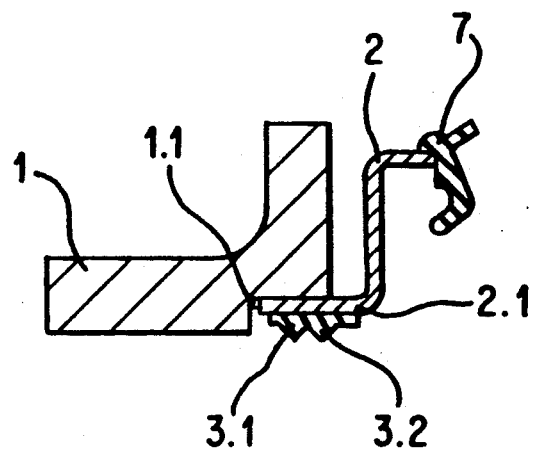
FIG. 2 a section A—A according to FIG. 1.
Figure 3:
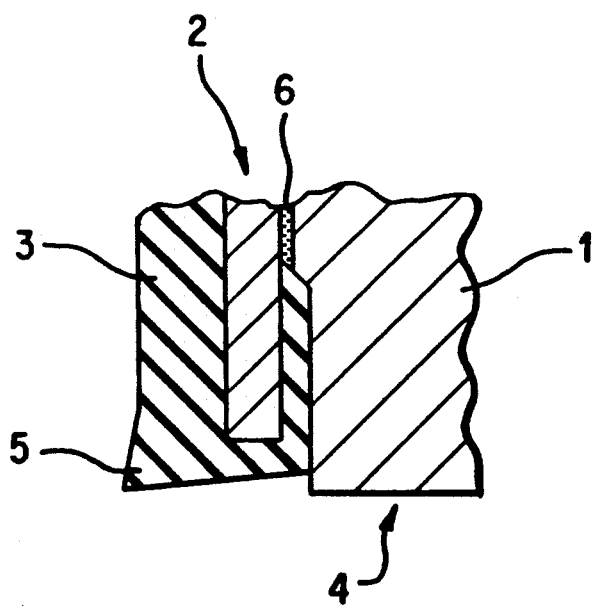
FIG. 3 a section B—B according to FIG. 1.

In FIGS. 1, 2 and 3 there is shown a crankshaft seal assembly for an internal combustion engine, which comprises a die cast carrier 1, a support piece 2, and a seal 3. The support piece 2 is defined by a flange section 2.1 projecting radially outward from an aperture, which flange is contained in an axially open recess 1.1 of the carrier 1. The flange section 2.1 has a thickness which is less than the depth of the recess 1.1. On the side facing axially away from the carrier 1, the flange section 2.1 has fixed thereto seal 3, which is provided with two axially projecting sealing lips 3.1 and 3.2. FIGS. 1 and 2 show the dynamically stressed shaft seal 7, which in use is in sealing contact with the crankshaft (not shown). For secure sealing the sealing lip 3 is formed integrally with transverse lip 5, as seen in FIGS. 1 and 3. The transverse lip 5 projects in a wedge shape beyond the transverse surface 4 of the injection-molded part 1 and the sealing lip 3 when in the as-manufactured state. In FIG. 3 the cement 6 is represented which joins the die cast carrier 1 and the support piece 2 together. The support piece 2 consists preferably of deep-drawn sheet metal, while the die cast carrier 1 consists of a pressure-cast light metal. The transverse lip 5 is represented in the unloaded state; when the crankshaft seal is installed, it is placed sealingly against an engine block, adjoining it on the left, thereby deforming to provide a seal for an oil pan adjoining it from below. In the as-manufactured state here represented, the transverse surface 4 reaches beyond the transverse lip 5, thereby effectively guarding against damage to the transverse lip 5 when the crankshaft seal is installed.

I claim:

1. Crankshaft seal assembly for an internal combustion engine having a block and a crankshaft, said assembly comprising
    a die cast carrier having an aperture for receiving said crankshaft axially therethrough and an axially open recess about said aperture,
    a support piece formed of sheet metal and having an aperture for receiving said crankshaft therethrough and a flange extending radially outward from said aperture in said piece, said flange being received in said recess in said carrier,
    a ring of polymeric material fixed to said support piece about said aperture in said piece, thereby providing sealing means for said crankshaft, and
    a seal fixed to said flange of said support piece opposite said carrier and having at least one axially projecting sealing lip which provides sealing means for said engine block, said seal being non-integral with said ring of polymeric material.

2. Crankshaft seal assembly as in claim 1 wherein said carrier has a transverse surface running in a plane parallel to the crankshaft, said seal having a transverse lip which, prior to installation on said engine, extends axially beyond said at least one axially extending sealing lip but does not extend beyond the plane of said transverse surface.

3. Crankshaft seal assembly as in claim 1 wherein said at least one axially extending sealing lip comprises a plurality of parallel axially extending sealing lips.

4. Crankshaft seal assembly as in claim 1 wherein said support piece is joined to said carrier by adhesive.

5. Crankshaft seal assembly as in claim 1 wherein said support piece is deep drawn.

6. Crankshaft seal assembly as in claim 1 wherein said carrier is pressure cast light metal.

7. Crankshaft seal assembly as in claim 1 wherein said recess has a depth and said flange has a thickness which is less than said depth.

* * * * *